(12) United States Patent
Goredema et al.

(10) Patent No.: US 8,465,887 B2
(45) Date of Patent: Jun. 18, 2013

(54) LOWER COST REUSABLE POLYMER BINDER

(75) Inventors: Adela Goredema, Mississauga (CA); Guerino Sacripante, Oakville (CA); Gabriel Iftime, Mississauga (CA); Kentaro Morimitsu, Mississauga (CA); Roger Gaynor, Oakville (CA); Peter M. Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 426 days.

(21) Appl. No.: 12/779,542

(22) Filed: May 13, 2010

(65) Prior Publication Data

US 2011/0281482 A1    Nov. 17, 2011

(51) Int. Cl.
*G03F 7/20*     (2006.01)
*G03F 7/00*     (2006.01)
*G03F 7/004*    (2006.01)

(52) U.S. Cl.
USPC ............... 430/19; 430/270.1; 430/270.15; 430/396

(58) Field of Classification Search
USPC ................ 430/19, 270.1, 270.15, 396
See application file for complete search history.

(56) References Cited

U.S. PATENT DOCUMENTS

| | | | | |
|---|---|---|---|---|
| 3,918,972 A | * | 11/1975 | Evens et al. | 430/337 |
| 4,026,869 A | * | 5/1977 | Evens et al. | 528/185 |
| 5,905,006 A | * | 5/1999 | Tavernier et al. | 430/14 |
| 7,247,262 B2 | * | 7/2007 | Evans et al. | 252/586 |
| 7,666,558 B2 | * | 2/2010 | Iftime et al. | 430/19 |
| 8,216,765 B2 | * | 7/2012 | Morimitsu et al. | 430/270.1 |
| 2008/0311491 A1 | * | 12/2008 | Iftime et al. | 430/19 |
| 2010/0173239 A1 | * | 7/2010 | Iftime et al. | 430/107.1 |
| 2011/0215283 A1 | * | 9/2011 | Morimitsu et al. | 252/586 |
| 2011/0281482 A1 | * | 11/2011 | Goredema et al. | 442/59 |
| 2012/0108775 A1 | * | 5/2012 | Faucher et al. | 526/259 |

FOREIGN PATENT DOCUMENTS

| | | | |
|---|---|---|---|
| EP | 2003496 A1 | * | 12/2008 |
| GB | 1373220 A | * | 11/1974 |

\* cited by examiner

*Primary Examiner* — Amanda C. Walke
(74) *Attorney, Agent, or Firm* — MH2 Technology Law Group LLP (57) ABSTRACT

Exemplary embodiments provide compositions for erasable media and methods of forming polymers for erasable media. The method can include providing a first monomer, the first monomer including one or more alkoxylated bisphenols and adding at least one second monomer and a catalyst to the first monomer to form a mixture at a first temperature, the second monomer selected from the group consisting of an organic diacid, a dialkyl ester of the organic diacid, and combinations thereof. The method can also include melt condensing the mixture by increasing the temperature from the first temperature to a second temperature over a first amount of time to form one or more polymers, wherein the one or more polymers has an acid value in the range of about 0.1 mg-KOH to about 12 mg-KOH.

8 Claims, 2 Drawing Sheets

LOWER COST REUSABLE POLYMER BINDER

DETAILED DESCRIPTION

1. Field of Use

The present teachings relate generally to erasable media and, more particularly, to methods of making low cost polymer binders and photochromic polymers for the erasable media.

2. Background

Erasable media is that which can be reused many times to transiently store images, the images being written on and erased from the erasable media. For example, photochromic paper employs photochromic materials to provide an imageable surface. Typically, photochromic materials can undergo reversible photoinduced color changes in the photochromic containing layer. For example, a light source of a certain wavelength can be used for imaging erasable media, while light and/or heat can be used for inducing erasure of imaged erasable media.

Spiropyrans (SPs) are the most commonly used photochromic molecules in the erasable media. Typically, an ultraviolet (UV) light exposure converts SPs from a colorless state to a colored state, while the colored state reverts back to the colorless state by a thermal treatment, as shown below:

Colorless state (Spiropyran) ⇌ Colored state (Merocyanine)

An erasable imaging formulation including spiropyran-polyester systems is the subject of U.S. patent application Ser. No. 12/400,276 filed Mar. 9, 2009 and titled "Reimageable And Reusable Medium And Method of Producing the Reimageable And Reusable Medium" which is commonly assigned with the present application to Xerox Corp., and is incorporated in its entirety herein by reference. The spiropyran-polyester systems showed temperature dependent coloration reaction (writing) coupled with longer image lifetimes when spiropyran molecules were covalently incorporated in a polyester backbone. In addition, the spiropyran-polyester system did not show significant background coloration under ambient lighting conditions. These performances are very promising for application of erasable media, but raw material cost was estimated to be high because some of the monomers required to make the photochromic polymer and the binder polymer are expensive. Binder polymer is required as it considerably improves the erasable media performance. The binder polymer has similar backbone structure, but does not contain photochromic molecules. The best composition requires two kinds of polymer which are both made from the expensive monomer. U.S. patent application Ser. No. 12/719,192 filed Mar. 8, 2010 and titled "Photochromic Polymer With Binder" which is commonly assigned with the present application to Xerox Corp., and is incorporated herein by reference in its entirety, describes new materials that significantly reduce the cost of the materials from about 40¢/page to about 6¢/page. However, a need still exists to further reduce material cost and get a unit manufacturing cost (UMC) that can provide attractive margins.

Thus, there is a need to overcome these and other problems of the prior art and to provide new methods of making low cost polymer binders and photochromic polymers and compositions for the erasable media to further reduce the unit manufacturing cost (UMC) of the erasable media.

SUMMARY

In accordance with various embodiments, there is a method of forming a polymer for erasable media. The method can include providing a first monomer, the first monomer including one or more alkoxylated bisphenols and adding at least one second monomer and a catalyst to the first monomer to form a mixture at a first temperature, the second monomer selected from the group consisting of an organic diacid, a dialkyl ester of the organic diacid, and combinations thereof, wherein an alkyl portion of the diacid can be straight, branched, or cyclic, saturated or unsaturated, substituted or unsubstituted having from 1 to about 40 carbon atoms, or substituted or unsubstituted aromatic or heterocyclic group. The method can also include melt condensing the mixture by increasing the temperature from the first temperature to a second temperature over a first amount of time to form one or more polymers, wherein the one or more polymers can have an acid value in the range of about 0.1 mg-KOH to about 12 mg-KOH.

According to various embodiments, there is a photochromic composite. The photochromic composite can include a photochromic polymer having the following general formula:

wherein x can range from about 1 to about 10, n can range from about 0 to about 1000, and m can range from 1 to about 1000. The photochromic composite can also include at least one polymer binder having one of the following general formulas:

wherein x can range from about 1 to about 10, n can range from about 1 to about 1000, and m can range from 1 to about 1000 and wherein each of the photochromic copolymer and the polymer binder can have a glass transition temperature in the range of about 30° C. to about 150° C.

According to another embodiment, there is an erasable medium including a substrate, wherein the substrate can be selected from the group consisting of paper, glass, ceramic, wood, plastic, fabric, textile, metal, plain paper, coated paper, no tear paper, and mixtures thereof. The erasable medium can also include a photochromic layer disposed over the substrate, the photochromic layer including one or more photochromic polymers dispersed in at least one polymer binder, at least one of the one or more photochromic polymers having the following general formula:

wherein x can range from about 1 to about 10, n can range from about 0 to about 1000, and m can range from 1 to about 1000, and the at least one polymer binder having one of the following general formulas:

wherein x can range from about 1 to about 10, n can range from about 1 to about 1000, and m can range from 1 to about 1000, and wherein each of the photochromic polymer and the polymer binder can have a glass transition temperature in the range of about 30° C. to about 150° C.

Additional advantages of the embodiments will be set forth in part in the description which follows, and in part will be obvious from the description, or may be learned by practice of the present teachings. The advantages will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. $-1$, $-2$, $-3$, $-10$, $-20$, $-30$, etc.

As used herein, the term "erasable medium" refers to a material including an imaging medium that can be reused multiple times to transiently store and/or remove images and/or documents. The erasable medium can be selectively or locally imaged and erased.

As used herein, the term "imaged erasable medium" refers to an erasable medium bearing a visible image, the image a result of, for example, ultraviolet (UV) writing of the erasable medium.

As used herein, the term "non-imaged erasable medium" refers to an erasable medium which has not been previously imaged, or an erasable medium having an image erased therefrom and available for writing. An exemplary erasable medium is described in connection with FIG. 1 below.

As used herein, the term "non-erasable" refers to traditional media of the type used in any conventional imaging such as ink jet, xerography, or liquid ink electrophotography, as known in the art. An example of a non-erasable traditional medium can be conventional paper.

As used herein, the term "ambient condition" refers to an indoor ambient environment including a light condition that has a light wavelength ranging from about 380 nm to about 750 nm at room temperature ranging from about 20° C. (68° F.) to about 25° C. (77° F.).

In a conventional erasable medium, a visible image is formed by exposing the erasable medium to radiant energy and the visible image is erased by thermal treatment. In contrast, in the disclosed erasable medium shown in FIG. 1, a visible image is formed by exposing the erasable medium to both radiant energy and thermal treatment and the visible image is erased by only thermal treatment.

Figure 1:
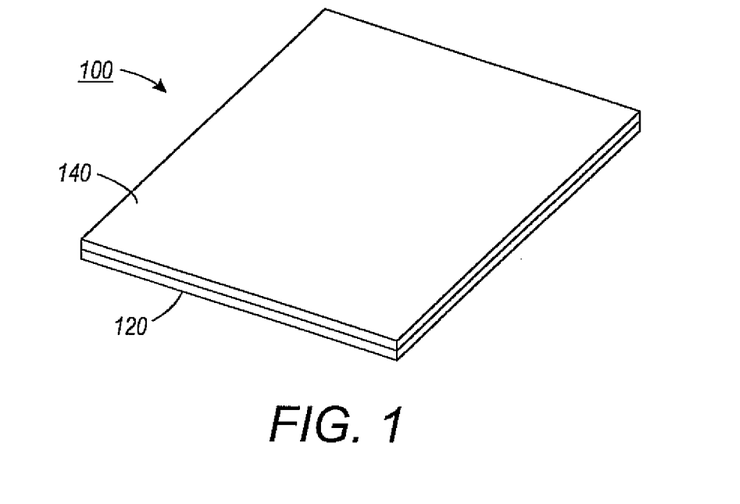
FIG. 1 shows a schematic illustration of an exemplary erasable medium in accordance with various embodiments of the present teachings.

FIG. 1 depicts an exemplary erasable medium 100 in accordance with various embodiments of the present teachings. It should be readily apparent to one of ordinary skill in the art that the medium 100 depicted in FIG. 1 represents a generalized schematic illustration and that other components can be added or existing components can be removed or modified.

As shown, the erasable medium 100 can include a substrate 120 and a photochromic layer 140 disposed over the substrate 120.

In various embodiments, the substrate 120 can be made of a flexible or a rigid material and can be transparent or opaque. The substrate 120 can include, for example, any suitable material such as paper, wood, plastics, fabrics, textile products, polymeric films, inorganic substrates such as metals, ceramics, and the like. The paper can include, for example, plain papers such as XEROX® 4024 papers, ruled notebook paper, bond paper, silica coated papers such as Sharp Company silica coated paper, Jujo paper, and the like. The plastic can include, for example, a plastic film, such as polyethylene film, polyethylene terepthalate, polyethylene naphthalate, polystyrene, polycarbonate, polyethersulfone. The substrate 120, such as a sheet of paper, can have a blank appearance.

In various embodiments, the substrate 120 can be a single layer or a multi-layer where each layer can be the same or different material and can have a thickness, for example, ranging from about 0.1 mm to about 10 mm and in some cases from about 0.2 mm to about 8 mm, and in some other cases from about 0.3 mm to about 5 mm.

In accordance with various embodiments, the photochromic layer 140 can include a photochromic composite including a photochromic polymer dispersed in at least one polymer binder. In some embodiments, the photochromic composite can include a photochromic polymer dispersed in one polymer binder. In other embodiments, the photochromic composite can include a photochromic polymer dispersed in two or more polymer binders. The photochromic composite can be impregnated, embedded, coated, and/or fused on to the substrate 120. In some embodiments, the photochromic composite can be applied as a separate distinct layer, such as the photochromic layer 140 over the substrate 120, as shown in FIG. 1. In other embodiments, the photochromic composite can be impregnated into the substrate 120. In embodiments, the photochromic composite can be applied to the substrate in one form, and dried to another form. Thus, for example, the photochromic composite including the photochromic polymer and the at least one polymer binder can be dissolved or dispersed in a solvent for application or impregnation into a substrate with the solvent being subsequently evaporated, hardened, or otherwise dried to form the photochromic layer 140.

In various embodiments, the photochromic polymer can include at least one photochromic moiety (PM) covalently bound to a polymeric backbone, as shown below in the Formula I:

Formula I

In Formula I, the polymeric backbone portion can be present in an amount ranging from about 0 to about 95%, or from about 10% to about 90%, or from about 10% to about 50% by weight of the total photochromic polymer of Formula I with n ranging from about 0 to about 1000 or from about 5 to 750, or from about 10 to about 500. Still in Formula I, the photochromic moiety (PM) can be present in an amount ranging from about 0.1% to about 100%, or from about 10% to about 90%, or from about 10% to about 50% by weight of the total photochromic polymer of Formula I with m ranging from about 1 to about 1000 or from about 5 to about 750, or from about 10 to about 500. In some embodiments, the photochromic polymer having the Formula I can be a random copolymer. In other embodiments, the photochromic polymer having the Formula I can be a block copolymer.

In some embodiments, the photochromic moiety (PM) can include one or more photochromic molecules or compounds bound to the backbone portion within its polymer chain. In certain embodiments, the photochromic moiety (PM) can be introduced into the polymer chain of the backbone portion by, for example including the photochromic molecules or compounds during the preparation process of the backbone portion, such as in the form of reactive units, monomer units, and the like. Alternatively, the photochromic moiety (PM) can be added to an already formed polymeric backbone portion through known chemical functionalization reactions. In various embodiments, where multiple types of photochromic moiety (PM) are present in the polymer chain of the backbone portion, the multiple types of photochromic moiety can be the same or different in the photochromic polymer of Formula I.

Any suitable photochromic moiety (PM) can be used, such as, for example, spiropyrans, spirooxazines, thiospiropyrans, benzos, naphthopyrans, stilbenes, azobenzenes, bisimidazols, spirodihydroindolizines, quinines, perimidinespirocyclohexadienones, viologens, fulgides, fulgimides, diarylethenes, hydrazines, anils, aryl thiosulfonates, and mixtures thereof.

In various embodiments, the photochromic polymer of formula I can include any suitable polymer as the backbone, such as, for example, polyalkylmethacrylates, polycarbonates, polystyrenes, polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohols, polyacrylic acids and the like. Copolymer materials such as polystyrene-acrylonitriles, polyethylene-acrylates, vinylidenechloride-vinylchlorides, vinylacetate-vinylidene chlorides, styrene-alkyd resins can also be used. The copolymers can be block, random, or alternating copolymers.

An exemplary polymer backbone of the photochromic polymer of Formula I can have the following general formula II:

Formula II

In Formula II, x can range from about 1 to about 10 or from about 2 to about 8 or from about 3 to about 6 and n can range from about 1 to about 1000 or from about 5 to about 750, or from about 10 to about 500.

In various embodiments, one particular example of a suitable photochromic polymer of Formula I, can have the following general Formula III:

Formula III

-continued

In Formula III, x can range from about 1 to about 10 or from about 2 to about 8 or from about 3 to about 6; m can range from about 1 to about 1000 or from about 5 to about 750, or from about 10 to about 500; and n can range from about 1 to about 1000 or from about 5 to about 750, or from about 10 to about 500, although other ranges for m and n can be used.

In some embodiments, the photochromic polymer having the Formula III can be a random copolymer. In other embodiments, the photochromic polymer having the Formula III can be a block copolymer.

In various embodiments, the photochromic layer 140 can further include at least one polymer binder. The polymer binder can be, for example, a suspending medium to hold the photochromic materials, in this case, the photochromic poymer, as a film or layer on the substrate 120 of interest. The polymer binder can provide any or all of the following properties, such as, for example, mechanical flexibility, robustness, and optical clarity.

Any suitable material can be used as a polymer binder. Exemplary polymer materials that can be used as binders include, but are not limited to, polymethylmethacrylates (PMMA), polycarbonates, polystyrenes, polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohols, polyacrylic acids and the like. Copolymer materials such as polystyrene-acrylonitriles, polyethylene-acrylates, vinylidenechloride-vinylchlorides, vinylacetate-vinylidene chlorides, styrene-alkyd resins can also be examples of suitable binder materials. The copolymers can be block, random, or alternating copolymers.

In various embodiments, the polymer binder can be selected such that it is similar in structure to the backbone portion of the photochromic polymer of Formula I. As used herein, a "similar" polymer or "similar type" polymer refers to polymers that differ in molecular weight, and/or polymers which may differ in chemical formulation, but fall into the same general class of chemical compounds. In embodiments, "similar" or "similar type" polymers can include one or more functional groups for the same general class of chemical compounds. In some embodiments, the polymer binder can have the general formula II shown above. In other embodiments, the polymer binder can have the following general formula IV:

Formula IV

In Formula IV, x can range from about 1 to about 10 or from about 2 to about 8 or from about 3 to about 6 and m can range from about 1 to about 1000 or from about 5 to about 750, or from about 10 to about 500. Polymer binder having either formula II or IV can be combined with the photochromic polymer having formula III to form a photochromic composite that can be used to form the photochromic layer 140.

In various exemplary embodiments, the photochromic polymer can be present in the photochromic layer 140 in an amount ranging from about 0.05% to about 99.5% or from about 0.1% to about 80% or from about 1% to about 60% by total weight of the photochromic composite in the photochromic layer 140.

Figure 2:
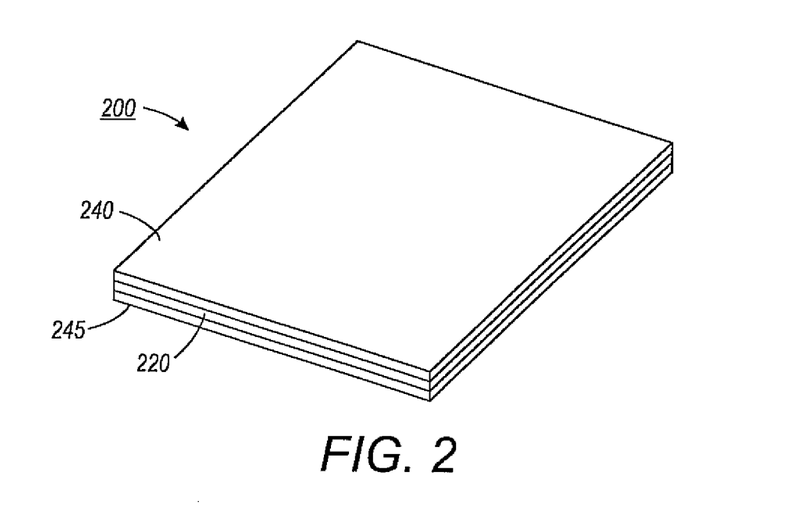
FIG. 2 shows a schematic illustration of another exemplary erasable medium in accordance with various embodiments of the present teachings.

FIG. 2 shows another exemplary erasable medium 200 in accordance with various embodiments of the present teachings. The erasable medium 200 can include a substrate 220, a photochromic layer 240 disposed over the substrate 220, and a second photochromic layer 245 disposed over the substrate on a side opposite to the photochromic layer 240. In various embodiments, the second photochromic layer 245 can include one or more photochromic polymers dispersed in at least one polymer binder. In some embodiments, the one or more photochromic polymers of the photochromic layer 240 and the second photochromic layer 245 can be the same. In other embodiments, the one or more photochromic polymers of the photochromic layer 240 and the second photochromic layer 245 can be different.

In certain embodiments, a protection filter film can be used to locally or wholly cover a photochromic layer 140, 240, 245 bearing visible images of the erasable medium 100, 200. The protection filter film can be an appropriate filter to cut unnecessary ultraviolet light from, for example, a fluorescent lamp.

In various embodiments, the protection filter film can be, for example, a yellow protection filter film applied over the photochromic layer 140, 240, 245.

Figure 3:
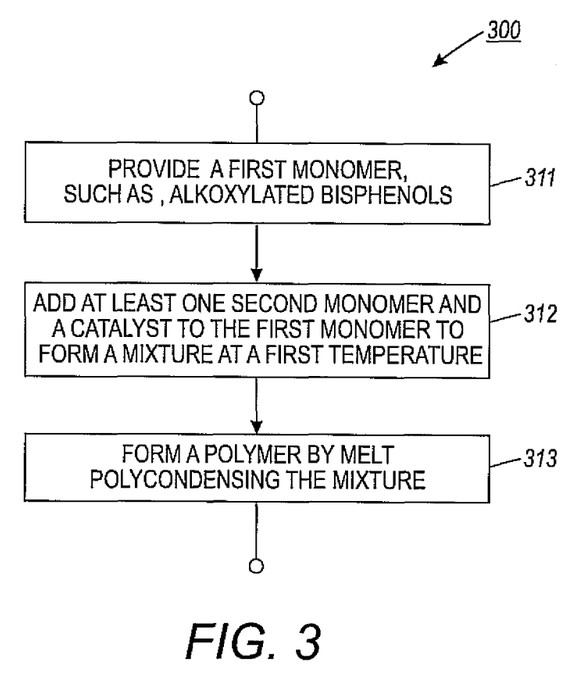
FIG. 3 depicts an exemplary method of forming a polymer for erasable medium in accordance with various embodiments of the present teachings.

Binder polymer and the photochromic polymer for the erasable media such as, the erasable medium 100, 200 shown in FIGS. 1 and 2 can be prepared by any suitable method. However, synthesis of the binder polymer and the photochromic polymer using melt condensation as shown below and described in FIG. 3 can result in cost savings:

Melt condensation reaction to form a binder polymer:

FIG. 3 depicts an exemplary method 300 of forming a polymer for the erasable media in accordance with various embodiments of the present teachings. In some embodiments, the polymer can be a binder polymer. In other embodiments, the polymer can be a photochromic polymer, such as, for example, a photochromic polymer. The method 300 can include a step 311 of providing a first monomer, monomer I in the above equation (1). Any suitable material can be used for the first monomer such as, for example, alkoxylated bisphenols. Exemplary alkoxylated bisphenols include, but are not limited to, 4-(2-hydroxyethyl)-bisphenol A, bis 4,4'-(2-hydroxyethyl)-bisphenol A, 4-(2'-hydroxyethyl-2-oxyethyl)-4'-(2-hydroxyethyl)-bisphenol A, bisphenol A propoxylate, bisphenol A ethoxylate, or mixtures thereof. In some embodiments, the step 311 of providing a first monomer can include forming the first monomer by heating a mixture of bisphenol A, alkylene carbonate, and potassium carbonate at a temperature in the range of about 155° C. to about 205° C. or from about 170° C. to about 195° C. or from about 175° C. to about 185° C. for any suitable amount of time, such as, for example, from about 2 hours to about 8 hours or from about 3 hours to about 6 hours or about 3 hours to about 5 hours. Any suitable alkylene carbonate having from 1 to about 40 carbon atoms can be used, such as, for example, propylene carbonate.

The method 300 can also include a step 312 of adding at least one second monomer, monomer II in the above equation (1) and a catalyst to the first monomer to form a mixture at a first temperature. In some embodiments, the at least one second monomer can include at least one of an organic diacid or a dialkyl ester of the organic diacid, wherein an alkyl portion of the diacid can be straight, branched, or cyclic, saturated or unsaturated, substituted or unsubstituted having from 1 to about 40 carbon atoms, or substituted or unsubstituted aromatic or heterocyclic group. In other embodiments, two or more second monomers can be added. Any suitable organic diacid can be used, including, but not limited to, fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azeilic acid, sebacic acid, terephthalic acid, isophthalic acid, phthalic acid, 1,2-cyclohexanedioic acid, 1,3-cyclohexanedioic acid, 1,4-cyclohexanedioic acid. Any suitable dialkyl ester, such as, for example esters of malonate, succinate, fumarate, itaconate, terephthalate, isophthalate, phthalate, cyclohexanedioate, and mixtures thereof can be used. In some embodiments, the alkyl group of the dialkyl ester can include about 2 to about 22 carbon atoms or from about 2 to about 18 carbon atoms or from about 3 to about 10 carbon atoms. Exemplary ester of the organic diacid can include, but is not limited to, dimethyl succinate, dimethyl terephthalate. Any suitable catalyst can be used, such as, for example, organotins including, but not limited to, tetraalkyl titanates; dialkyltin oxide such as dibutyltin oxide; tetraalkyltin such as dibutyltin dilaurate; dialkyltin oxide hydroxide such as butyltin oxide hydroxide; organotitanates; lanthanide triflates; aluminum alkoxides; alkyl zinc; dialkyl zinc; zinc oxide; and stannous oxide. Exemplary catalyst include, but are not limited to, butyl stannoic acid available as FASCAT® 4100, dibutyl tin oxide available as Fascat® 4201, and dibutyl tin diacetate available as Fascat® 4100, all from Arkema Inc, Philadelphia, Pa.; and tetra-isopropyl titanate.

The method 300 of forming a polymer for erasable media can further include a step 313 of melt condensing the mixture by increasing the temperature from the first temperature to a second temperature over an amount of time to form one or more polymers. In some embodiments, the first temperature and the second temperature can be in the range of about 80° C. to about 205° C. or from about 120° C. to about 195° C. or from about 165° C. to about 185° C. The amount of time can range from about 1 hour to about 12 hours or from about 3 hour to about 9 hours from about 3 hour to about 6 hours. In certain embodiments, the step of melt condensing can further include collecting reaction by-products such as, for example, water, methanol, and the like via distillation and reducing the pressure of the mixture while keeping the temperature constant at the second temperature for an amount of time ranging from about 1 hour to about 6 hours or from about 1 hour to about 5 hours or from about 1 hour to about 3 hours. In some cases, the pressure can be reduced to in the range of about 1 mmHg to about 30 mmHg or from about 1 mmHg to about 10 mmHg or from about 1 mmHg to about 5 mmHg.

In various embodiments, each of the one or more polymers can be used as a binder polymer and can have an acid value in the range of about 0.1 mg-KOH to about 12 mg-KOH or in the range of about 0.1 mg-KOH to about 5 mg-KOH or in the range of about 0.1 mg-KOH to about 2 mg-KOH.

In various embodiments, the method 300 of forming a polymer for the erasable media can also include adding a photochromic monomer to the mixture before the step 213 of of melt condensing, as shown below:

Melt condensation reaction to form a Photochromic Polymer

Photochromic monomer

Photochromic Polymer (2)

Any suitable material can be used for the photochromic monomer, such as, for example, spiropyrans, spirooxazines, chromenes, spirodihydroindolizines, spiroperimidines, azobenzenes, thioindigos, thiospyropyrans, benzos, stilbenes, bisimidazols, quinines, perimidinespirocyclohexadieonones, viologens, fulgides, fulgimides, diarylethenes, hydrazines, anils, aryl thiosulfonates, and combinations thereof. A specific example of the photochromic monomer can have the formula V as shown below:

Formula V

The photochromic monomers in general are heat sensitive and hence reaction scheme (2) should be carried out at lower reaction temperature than that used for making the binder polymer. In various embodiments, any suitable catalyst that can lower the melt condensation reaction temperature for the synthesis of photochromic polymer can be used, such as, for example, cerium triflate, samarium triflate, terbium triflate, and the like. In some embodiments, the melt condensation reaction temperature for the synthesis of the photochromic polymer can be in the range of about 50° C. to 150° C. or from about 60° C. to about 130° C. or from 80° C. to about 120° C.

In certain embodiments, the step of melt condensing can further include collecting reaction by-products such as, for example, water, methanol, and the like via distillation and reducing the pressure of the mixture while keeping the temperature constant for an amount of time ranging from about 5 hour to about 40 hours or from about 8 hour to about 30 hours or from about 10 hours to about 20 hours. In some cases, the pressure can be reduced to in the range of about 1 mmHg to about 30 mmHg or from about 1 mmHg to about 10 mmHg or from about 1 mmHg to about 5 mmHg.

In various embodiments, the binder polymer and/or the photochromic polymer can have a glass transition temperature in the range of about 30° C. to about 150° C. or in some cases in the range of about 35° C. to about 120° C. or in other cases in the range of about 40° C. to about 100° C.

Binder polymers synthesized using melt condensation reaction shown in scheme (1) can result in lower cost of manufacturing of erasable media, firstly due to the substantial elimination of solvent and secondly due to the reduction in the cost of raw materials by about 30%, as carboxylic acids are much cheaper than acid chlorides; e.g. while adipoyl dichloride may cost about $25/Kg, adipic acid may cost about $3.60/Kg. Furthermore, simplification of the synthesis process and substantial elimination of the solvent from the synthesis can make the erasable medium even more "green". As shown in the reaction scheme (2), photochromic polymers can also be made by melt condensation and thereby can further reduce material costs for the erasable medium.

In various embodiments, a portion of the photochromic layer 140, 240, 245 can be exposed to both a radiant energy and thermal treatment to form a visible image on the erasable media 100, 200. In certain embodiments, the visible image can be formed by heating the erasable medium 100, 200 at a temperature in the range of about 30° C. to about 150° C., in some case in the range of about 30° C. to about 125° C. and in some other cases in the range of about 30° C. to about 100° C. and exposing it to a radiant energy including UV light. In some cases, the radiant energy can have a wavelength in the range of about 200 nm to about 475 nm or from about 350 nm to about 370 nm. In other embodiments, the radiant energy can have a single UV light wavelength of about 365 nm. In various embodiments, the photochromic layer 140, 240, 245 can be exposed to the radiant energy for a time period ranging from about 10 milliseconds to about 5 minutes, particularly from about 30 milliseconds to about 1 minute. The radiant energy can have an irradiance ranging from about 0.1 mW/cm$^2$ to about 100 mW/cm$^2$, or from about 0.2 mW/cm$^2$ to about 70 mW/cm$^2$, or from about 0.5 mW/cm$^2$ to about 40 mW/cm$^2$.

In various exemplary embodiments, the radiant energy corresponding to the predetermined image can be generated by a radiant energy source, for example, by a computer on a light emitting diode (LED) array screen and the visible image can be formed or written on the erasable medium by placing the erasable medium 100, 200 on the LED screen for the period of time. In other exemplary embodiments, a UV raster output scanner (ROS) or a UV laser diode (LD) can be used to generate UV light to sensitize the one or more photochromic molecule-polymer systems from a colorless state to a colored state.

According to various exemplary implementations, the color contrast that renders the written image visible to an observer can be a contrast between, for example two, three or more different colors. The term "color" can encompass a number of aspects such as hue, lightness and saturation, where one color may be different from another color if the two colors differ in at least one aspect. For example, two colors having the same hue and saturation but different in lightness would be considered different colors. Any suitable colors such as, for example, red, white, black, gray, yellow and purple, can be used to produce a color contrast as long as the visible image is visible to the naked eye of a user. In various exemplary embodiments, the following exemplary color contrasts can be used: purple visible image on a white background; yellow visible image on a white background; dark purple visible image on a light purple background; or light purple visible image on a dark purple background.

Upon the removal of exposure to the radiant energy and returning the erasable medium 100, 200 to the ambient temperature, the visible image can have an optical density difference with a background area of about 0.05 or more, in some cases an optical density difference of about 0.1 or more and in some other cases an optical density difference of about 0.2. In various exemplary embodiments, the color contrast of the visible image on the erasable medium 100, 200 can be maintained or readable under ambient light conditions for a period of time of at least several hours, such as, for example, for a period of about 4 hours to about 10 weeks or about 12 hours to about 5 weeks or in some cases for a period of about 24 hours to about 5 days. Yet, in some other embodiments, the color contrast of the visible image on the erasable medium can be maintained or readable without protection filter film for at least about 4 hours, in some cases for at least about 12 hours, and in some other cases of at least about 24 hours.

In various embodiments, the writability of the erasable medium can be characterized by optical density of the visible image written on the erasable medium 100, 200. Optical density (OD), also known as absorbance can be measured after certain period of time from the application of the first stimulus for writing. Optical density difference $\Delta OD$ can be determined by the difference between the optical density of the written image $OD_{Image}$ and the optical density of the background areas $OD_{background}$. $\Delta OD$ can thus be used to characterize color contrast between the written image and the background areas. Contrast Ratio (CR) is defined as background reflectance/Image reflectance (i.e. $CR=R_{bkg}/R_{Image}$; $\Delta OD=\log_{10}(CR)$), where reflectance (R) is the ratio of reflected energy to the amount of incident energy and is related to optical density (OD) as follows:

$$OD=\log(1/R) \text{ or } R=1/(10^{OD})$$

The initial optical density difference $\Delta OD$ ($\Delta OD_{t=0}$) between the image and the surrounding background areas upon the application of the first stimulus for writing can be used to characterize initial writability of the erasable medium 100, 200. In various embodiments, the disclosed erasable medium can have an initial $\Delta OD$ ($\Delta OD_{t=0}$) of at least about 0.4, or at least about 0.5 or in some cases at least about 0.6.

Additionally, $\Delta OD$ can be used to characterize lifetime of a visible image, i.e., the lifetime of the color contrast between the written image and its background areas. When measuring, in embodiments, $\Delta OD$ can be normalized by dividing by initial $\Delta OD$ ($\Delta OD_{t=0}$) so that image lifetime can be fairly compared in terms of decoloration ratio.

In various embodiments, the erasable medium bearing the image can be erased by removing the color contrast between the exposed portion of the photochromic layer and the non-exposed region of the photochromic layer.

In various exemplary embodiments, erasure of the visible image can occur by any of the following: (i) changing the color of the portion of the photochromic layer exposed to the writing stimulus (radiant energy and heat) to the color of the region not exposed to the writing stimulus; (ii) changing the color of the non-exposed region to the color of the exposed region; or (iii) changing the color of the exposed region and the color of the non-exposed region to the same color different from both the exposed region color and the non-exposed region color.

In some embodiments, the visible image can be erased by heating the erasable medium 100, 200 at a temperature greater than the writing temperature, such as, for example; in the range of about 50° C. to about 200° C. and in some cases in the range of about 70° C. to about 120° C. In other embodiments, the temperature for erasing can range from about 80° C. to about 100° C. In certain embodiments, an erasable medium bearing the visible image can be erased in an erase-on-demand manner. For example, the erasable medium bearing the visible image can be selectively exposed to a heat. The exposed portion of the photochromic layer for erasure can, for example, change from the colored state to the colorless state at a temperature about 50° C. to about 200° C. or in the range of about 70° C. to about 120° C. or in the range of about 80° C. to about 100° C. by a radiant energy source or a heat source, such as a radiant heater providing infrared (IR) irradiation, a hotplate or the like.

In various embodiments, the disclosed erasable medium 100, 200 can be reused by exposing the erasable medium 100, 200 to the radiant energy and heat for writing at least one additional time.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Synthesis of Binder Polymer (GS30631-58) by Melt Condensation

Binder polymer GS30631-58 was prepared according to the following reaction scheme (3):

A 1 liter Parr reactor equipped with a stirrer, distillation apparatus and bottom drain valve, was charged with about 268 grams of bisphenol-A, about 248 grams of propylene carbonate and about 0.54 grams of potassium carbonate. The mixture was heated to about 185° C. at about 200 revolutions per minute for a duration of about 3 hours, and then allowed to cool to about 165° C. To this was then added about 20 grams of ethylene glycol, about 139 grams of succinic acid and about 0.5 grams of FASCAT® 4100 (Arkema Inc, Philadelphia, Pa.). The mixture was gradually heated to about 195° C. over about 3 hour time period, wherein water was collected in the distillation receiver. The pressure was then reduced to about 1 mm-Hg over about 2 hour period, where the excess ethylene glycol was collected. The polymer was then discharged through the bottom drain, where upon cooling resulted in a clear amorphous resin, a polyester binder with an acid value of about 1.6 mg-KOH and a glass transition temperature of about 40° C. The polyester binder had a number average molecular weight of about 2,900 g/mole and weight average molecular weight of about 8100, as determined by Gel Permeation Chromotography.

The binder polymer GS30631-58 can be about 94% cheaper (decrease from about $61.00 to about $3.50) than the binder polymer synthesized using solution process as described in Comparative Example 1.

Example 2

Synthesis of Binder Polymer (G530631-64) by Melt Condensation

Binder polymer GS30631-64 was prepared according to the following reaction scheme (4):

A 1 liter Parr reactor equipped with a stirrer, distillation apparatus and bottom drain valve, was charged with about 268 grams of bisphenol-A, about 248 grams of propylene carbonate, and about 0.54 grams of potassium carbonate. The mixture was heated to about 185° C. at about 200 revolutions per minute for a duration of about 3 hours, and then allowed to cool to about 165° C. To this was then added about 45.7 grams of dimethyl terephthalate, about 148.5 grams of dimethyl succinate, about 20 grams of ethylene glycol and about 0.5 grams of FASCAT® 4200 (Arkema Inc, Philadelphia, Pa.). The mixture was gradually heated to about 195° C. over about 3 hours, wherein water and methanol were collected in the distillation receiver. The pressure was then reduced to about 1 mm-Hg over about 2 hour period, where the excess ethylene glycol was collected. The polymer was then discharged through the bottom drain, where upon cooling resulted in a clear amorphous resin with an acid value of about 1.1 mg-KOH and a glass transition temperature of about 47° C. The binder polymer GS30631-64 had a number average molecular weight of about 3,000 g/mole and a weight average molecular weight of about 5,100, as determined by Gel Permeation Chromotography.

Example 3

Preparation of a Bis-Hydroxylmethyl Photochrome (Prior Art)

U.S. Pat. Nos. 4,026,869 and 3,918,972; and U.S. patent application Ser. No. 12/400,276 describe in detail the synthesis of the photochromic monomer, the disclosures of which are incorporated by reference in their entirety.

About 34.4 g of α,α'-dibromoparaxylene and about 41.5 g of 2,3,3-trimethyl-indolenine together with about 400 ml of toluene were refluxed while stirring for about 1 day. After cooling, the precipitate was filtered and washed with acetone to yield α,α'-bis[2,3,3-trimethyl-3H-indolium-yl(1)]-p-xylene-dibromide.

About 25 g of the latter product was dissolved in about 500 ml of water. After addition of about 60 ml of ammonium hydroxide the solution was treated with ether and dried over magnesium sulphate. The ether was evaporated. After triturated in cold ether a white precipitate of α,α'-bis[2-methylene-3,3-diimethylindolinyl(1)]-p-xylene-dibromide formed, which was filtered off.

About 9.6 g of the latter product and about 9.0 g of 4-hydroxymethyl-5-nitrosalicylaldehyde were dissolved in about 250 ml of methyl ethyl ketone (MEK) and the solution was refluxed for about 4 hours, whereafter the methyl ethyl ketone was distilled off. The residue was dissolved in dichloromethane and washed with aqueous NaHCO$_3$ solution, then dried over magnesium sulphate. After the solvent was distilled off bis-hydroxylmethyl photochrome was obtained.

Prophetic Example 1

Synthesis of Photochromic Polymer SP-BPA-C4 by Melt Condensation

The photochromic Polymer SP-BPA-C4 can be synthesized via melt condensation according to the following reaction scheme (5). The photochromic monomer, bis-hydroxylmethyl photochrome in the reaction scheme 5 can be synthesized as outlined in Example 3.

(5)

Photochromic Polymer

A 1 liter Parr reactor equipped with a stirrer, distillation apparatus and bottom drain valve, is charged with about 268 grams of bisphenol-A, about 248 grams of propylene carbonate and about 0.54 grams of potassium carbonate. The mixture is heated to about 185° C. at about 200 revolutions per minute for a duration of about 3 hours, and then allowed to cool to about 80° C. To this is then added about 190 grams of dimethyl succinate, about 101 grams of photochromic monomer and about 0.5 grams of samarium triflate (Aldrich Co. Milwaukee. Wis.). The mixture is gradually heated to about 100° C. and stirred for 1 hour. The pressure is then reduced to about 1 mm-Hg and maintained for 20 hours. The polymer is then discharged through the bottom drain, where upon cooling will result in a purple amorphous resin, a photochromic polymer.

Example 4

Synthesis of Photochromic Polymer SP-BPA-C6 (Prior Art)

U.S. patent application Ser. No. 12/719,192 describes in detail the synthesis of the photochromic polymer, disclosure of which is incorporated by reference in its entirety.

About 3.5 grams of adipoyl chloride was dissolved in about 45 ml of dry dichloromethane (DCM). About 1.5 grams of bis-hydroxymethyl photochrome of Example 3 and about 0.47 grams of 4-(dimethylamino)pyridine (DMAP) dissolved in about 5 ml of dry DCM were slowly added to the adipoyl chloride solution. The reaction mixture was stirred at room temperature for about 30 minutes.

Separately, about 4 grams of bisphenol A (BPA) and about 4.5 grams of DMAP were dissolved in about 10 ml of dry DCM. The BPA solution was slowly added to the above reaction mixture in an ice bath. After the addition, the combined solution was removed from the ice bath and the reaction mixture was stirred at room temperature for about 2 hours.

Resulting DMAP salt was removed by filtration and the filtrate was washed with water three times. The organic layer was dried over magnesium sulfate and the solution was concentrated. The solution was dropped into stirring hexane and stirred overnight. The resulting precipitates were collected by filtration and dried under vacuum. The molecular weight of the product was about 23,300, polydispersity index of about 2.63, and the glass transition temperature was about 77° C.

The structure of the photochromic polyester, SP-BPA-C6 is shown below:

Comparative Example 1

Synthesis of Binder Polymer (BPA-6) (Prior Art)

About 87 grams of BPA and about 93 grams of DMAP were dissolved in about 850 ml of dry DCM. About 70 grams of adipoyl chloride in about 140 ml of dry DCM were slowly added to the BPA solution in an ice bath. After the addition, the solution was removed from the ice bath and the reaction mixture was stirred at room temperature for about 2 hours. Resulting DMAP salt was removed by filtration and the filtrate was washed with water two times. The organic layer was dried over magnesium sulfate and the solution was concentrated. The solution was dropped into stirring hexane and stirred overnight. Resulting presipitates were crushed into small pieces and dried by vacuum. The product had a molecular weight of about 15,200, a polydispersity index of about 2.48 and a glass transition temperature of about 60° C.

The structure of BPA-C6 is shown below:

Example 5

Writability and Image Lifetime Measurements of Photochromic Polyesters

Formulations were made with the new low cost binders of Examples 1 and 2 and the photochromic polymer SP-BPA-C6 of Example 4 and evaluated for writability and image lifetime for three days under office lighting condition (400 lux). For comparison, a control formulation was made with mainline binder polymer of Comparative Example 1 and the photochromic polymer SP-BPA-C6 of Example 4. Formulations were coated over a conventional paper substrate using a draw down coating procedure, then dried in air overnight to form erasable medium.

The erasable medium were irradiated with a UV LED at a wavelength of about 365 nm at a speed of about 2.5 ppm while heating at about 70° C. After writing, the samples were kept in standard room light conditions (fluorescent bulbs; 400 lux) for 3 days without yellow protection. The optical density for written ($OD_{Image}$) and for background ($OD_{Bkg}$) was measured using reflection spectrometry before and after 3 days using Spectrolino Spectrophotometer (GretagMacbeth, New Windsor, N.Y.). The $\Delta OD$ is the difference in optical density between the image ($OD_{Image}$) and the background ($OD_{Bkg}$). The $\Delta OD$ values are average of two tests for each sample set. Table 1 shows the results comparing the new low cost binders with the mainline binder.

numbers II and III have very low acid numbers and have lower background coloration compared to the control media, sample #I. If there is a higher acid concentration in the media, the acid is believed to interact with the photochromic polymer and stabilize the more polar colored state which leads to more background coloration. Reducing the acid number helps minimize the background coloration.

If the main line binder polymer can be replaced with the low cost binders of the present disclosure, the raw material cost (photochromic polymer, binder and coating solvent) of the reusable paper media can decrease by greater than about 25%.

The materials disclosed in accordance with present teachings have significant image stability when compared with the standard first generation of reusable paper (spiropyran coated with polymer binder) which fades completely in about 1 day in standard room light conditions. It should also be noted that OD of background increased a little bit over the time, but it was not significant. No yellow protection was required while the samples kept long image lifetime.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

TABLE 1

| | Composition | | | | | **Image Lifetime after 3 days | | |
| --- | --- | --- | --- | --- | --- | --- | --- | --- |
| Sample # | Material | Name | Tg (° C.) | Acid Value | *Writability $\Delta OD(0)$ | $\Delta OD$ (3 days) | % of initial $\Delta OD$ (3 days) | Background Coloration OD |
| I (Control) | Photochromic Polymer | SP-BPA-C6 (Example 4) | 78 | — | 0.88 | 0.62 | 70% | 0.27 |
| | Polymer Binder | Mainline (Comparative Example 1) | 52 | 4.5 | | | | |
| II | Photochromic Polymer | SP-BPA-C6 (Example 4) | 78 | — | 0.85 | 0.65 | 76% | 0.18 |
| | Polymer Binder | (Example 1; GS30631-58) | 40 | 1.6 | | | | |
| III | Photochromic Polymer | SP-BPA-C6 (Example 4) | 78 | — | 0.80 | 0.59 | 75% | 0.18 |
| | Polymer Binder | (Example 2; GS30631-64) | 47 | 1.1 | | | | |
| | Target | | | | >0.75 | >0.4 | | |

Media made with the low cost binders (sample #II and III) had $\Delta OD$ at time zero very similar to that of media made from mainline binder (sample #I); both samples give $\Delta OD$ at time zero that meets the target of 0.75 and have image lifetime greater than the target level of 0.4 after 3 days. Both sample

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An erasable medium comprising:
a substrate, wherein the substrate is selected from the group consisting of paper, glass, ceramic, wood, plastic, fabric, textile, metal, plain paper, coated paper, no tear paper, and mixtures thereof; and
a photochromic layer disposed over the substrate, the photochromic layer comprising one or more photochromic polymers dispersed in at least one polymer binder, at least one of the one or more photochromic polymers having the following general formula:

wherein x ranges from about 1 to about 10, n ranges from about 1 to about 1000, and m ranges from 1 to about 1000, and
the at least one polymer binder having one of the following general formulas:

wherein x ranges from about 1 to about 10, n ranges from about 1 to about 1000, and m ranges from 1 to about 1000, and
wherein each of the photochromic polymer and the polymer binder has a glass transition temperature in the range of about 30° C. to about 150° C.

2. The erasable medium of claim 1, wherein the polymer binder has an acid value in the range of about 0.1 mg-KOH to about 12 mg-KOH.

3. The erasable medium of claim 1, wherein a portion of the photochromic layer changes from a colorless state to a colored state upon exposure to a temperature in the range of about 30° C. to about 150° C. and a radiant energy.

4. The erasable medium of claim 3, wherein a portion of the photochromic layer comprises an image having an image lifetime of at least about 3 days.

5. The erasable medium of claim 4, wherein the image has an initial optical density difference with a surrounding background area of about 0.75 or greater.

6. The erasable medium of claim 5, wherein after 3 days from the exposure, the image has an optical density difference with a surrounding background area of at least about 40% of the initial optical density difference.

7. The erasable medium of claim 3, wherein the portion of the photochromic layer changes from the colored state to the colorless state upon exposure to a temperature in the range of about 50° C. to about 200° C.

8. The erasable medium of claim 1 further comprising a second photochromic layer disposed over the substrate on a side opposite to the photochromic layer, the second photochromic layer comprising one or more photochromic polymers dispersed in at least one polymer binder, at least one of the one or more photochromic polymers having the following general formula:

wherein x ranges from about 1 to about 10, n ranges from about 1 to about 1000, and m ranges from 1 to about 1000; and the at least one polymer binder having one of the following general formulas:

wherein x ranges from about 1 to about 10 and wherein each of the photochromic polymer and the polymer binder has a glass transition temperature in the range of about 30° C. to about 150° C.

* * * * *